United States Patent Office 2,711,465
Patented June 21, 1955

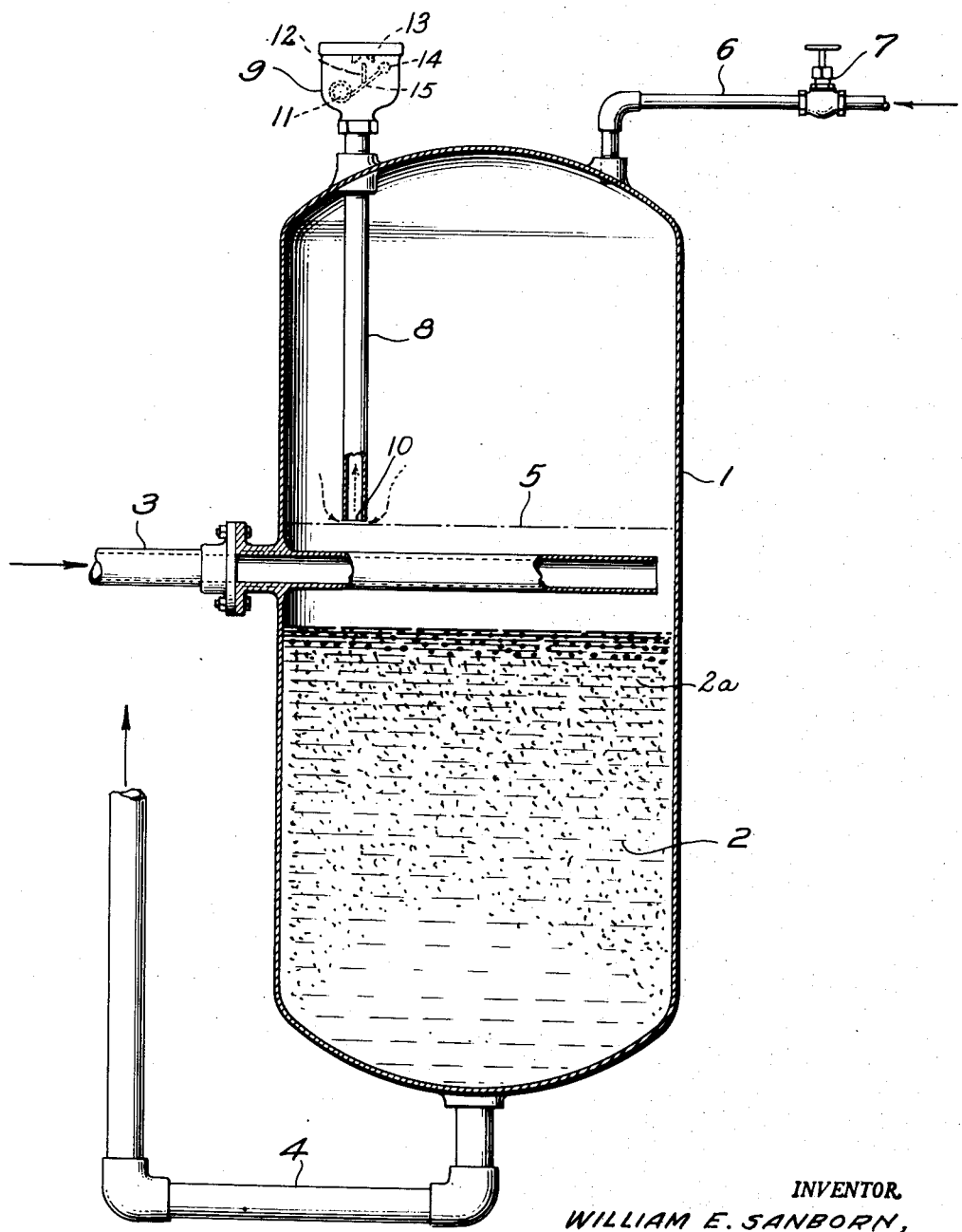

2,711,465

LIQUID LEVEL CONTROL

William E. Sanborn, Rowayton, Conn., assignor to American Cyanamid Company, New York, N. Y., a corporation of Maine Application June 16, 1950, Serial No. 168,437

2 Claims. (Cl. 210—24)

This invention relates to a liquid level control and more particularly, to a liquid level control adapted for use in ion exchange operations.

The present invention is particularly adapted for use in ion exchange operations and accordingly the following description will be directed to such operations. As will be pointed out later, however, it should be understood that the liquid level control which constitutes the present invention has other applications.

The past ten years or so has seen rapid progress and development in the treatment of liquids with ion exchangers, particularly for the purpose of demineralizing the liquid in question. A combination of cation active materials to remove cations from solutions and of anion active materials to remove anions from solution is generally used. These materials are placed in suitable vessels and the liquid containing ions which it is desired to remove therefrom is passed through alternate beds of the ion exchange materials.

The vessels which may be termed ion exchange columns are usually partially filled with the desired ion active material with an amount of "free board" above the level of the ion exchange material. In a normal downflow installation liquid to be treated is introduced into the vessel above the level of the ion exchange material, is passed downwardly through, and in contact with, the ion exchange material, and is removed from the bottom of the vessel. When the ion exchange material becomes exhausted to the ions present in the solution which are being removed in the process, the bed of ion exchange material is subjected to various washings and chemical regenerating procedures.

Throughout the above operations of exhaustion and regeneration of ion exchange material it is desirable to maintain a predetermined suitable liquid level in the vessel. The liquid level should not be allowed to fall to a point where turbulence of the influent disturbs the surface of the ion exchanger or particularly where it exposes any of the ion active material because air would then become locked in the bed and as a consequence the flow-resistance of the bed would be increased and its effectiveness and exchange capacity reduced. At the same time the liquid should not be permitted to accumulate above the level of the ion exchange material more than is necessary for maintaining even distribution because then the total operation efficiency of the ion exchange unit would be reduced. For example, if a sugar solution were being treated and were allowed to accumulate while in an acid condition, undesirable inversion of the sugar would take place and moreover, the juice would become unnecessarily diluted because an excessive amount of water would be needed for downward displacement thereof. Similarly if a regeneration process is in progress and excess regenerant solution is permitted to accumulate above the level of the ion exchange material, undesirable dilution of the regenerant solution by the excessive amount of wash water necessary to downwardly displace it would result.

It is an object of the present invention to provide a means for controlling the liquid level in a closed vessel containing both granular solid material and liquid.

Another object of the present invention is to provide a liquid level control for an ion exchange operation.

A further object of the present invention is to provide a liquid level control for a downflow ion exchange operation.

It is another object of the present invention to provide a vessel partially filled with solid granular material, through which vessel liquid is flowing and which vessel is provided with means for maintaining the level of the liquid a predetermined distance above the top of the bed of granular material.

It is a further object of the present invention to provide a liquid level control for use in ion exchange operations involving the treatment of sugar solutions.

The above and other objects are attained by providing new and improved means within a closed vessel for controlling fluid pressure in the vessel above the liquid level so that the liquid level rises or falls to the desired level automatically.

My new and improved liquid level control operates by varying the pressure of a gaseous medium, generally air, in the space above the liquid level.

The invention will be described in conjunction with the accompanying drawing in which the figure represents a vertical cross section of an ion exchange column equipped with my new means for controlling the liquid level.

Referring now to the figure, the cylindrical upright tank 1 containing a bed of ion exchange material 2 is provided with a liquid inlet 3 and outlet 4. Thus in normal uninterrupted operation liquid to be treated is introduced into the tank or vessel 1 at 3 whereupon it passes downwardly through bed 2 of ion exchange material and thence is discharged from the bottom of the tank at 4.

In the top of the tank 1 above the desired liquid level 5 is located a source 6 of gas under pressure, i. e., air, carbon dioxide or inert gas such as nitrogen and the like, greater than the maximum liquid pressure in the tank. The rate of air flow is controlled by valve 7 which may conveniently be a plug cock of suitable orifice size. Also in the top of the tank above the desired liquid level 5 is conduit 8 extending from just above the desired liquid level to a gas vent valve 9.

When flow is retarded in the outlet 4, operation of my liquid level control is as follows: If liquid is fed into the vessel at 3 faster than it flows out at 4 the liquid level rises until it is above the open end 10 of the conduit 8, thus sealing off the gas vent 9. Gas pressure, from the source 6, then builds up in the upper portion of the cell forcing liquid up the conduit 8 closing the vent valve 9 until the back pressure of liquid is overcome and the liquid $2a$ is forced out from the bottom of the tank at 4. The exertion of pressure continues until the liquid level drops below the open end 10 of the conduit 8 when liquid drains out of the conduit and/or the vent valve, thus releasing gas pressure in the tank 4 through the vent valve 9 and decreasing the flow rate of effluent at 4. It will thus be evident that intermittent release of gas through conduit 8 will maintain substantially steady flow and pressure of the liquid in the tank. The gas vent valve 9 can be operated by any standard float actuated valve. In the drawing, the arm 15 supported from the fulcrum 14, carries the needle valve 12 and ball float 11. When the liquid rises in the gas vent valve 9, the ball float rises and causes the valve needle 12 to bear against the valve seat 13, thus preventing any liquid from escaping from the gas vent valve 9.

The apparatus of the present invention is particularly adapted for use in ion exchange operations including the treatment of sugar solutions such as sugar juices, molasses, citrus fruit juices and the like, as well as other solutions containing ionic "impurities." Operations for softening or demineralizing water and aqueous solutions of glycols, glycerine, formaldehyde, metal salts, etc., are also contemplated.

The liquid level control of the present invention, while particularly suitable for use in ion exchange operations, may generally be used in any system or operation wherein a moving stream of liquid is brought into contact with a relatively stationary bed of granular solid material within a closed vessel.

It is an advantage of the present invention that an extremely simple arrangement permits maintenance of the liquid level in a closed vessel at a desired point.

It is another advantage of the present invention that my new liquid level control has few moving parts and is therefore inexpensive to install and to maintain.

Still another advantage of the liquid level control of the present invention is its simplicity in that no large ball float inside the column with its necessary stuffing box is required. My liquid level control is therefore suitable for use in small vessels as well as in large operations.

I claim:

1. In an apparatus adapted for use in bringing a moving stream of liquid down through, and in contact with, a relatively stationary bed of granular material which comprises a vessel partially filled with granular material and having a liquid inlet above the level of said granular material but below the top of said vessel, a liquid outlet below said granular material at the bottom of said vessel, means for maintaining a desired liquid level above said liquid inlet which comprises a gas inlet above the liquid inlet whereby gas under pressure greater than the maximum liquid pressure in said vessel may be fed to said vessel, the improvement which comprises a conduit extending upwardly from said liquid inlet to a single gas vent valve having a float therein which holds the valve open when the valve is free of liquid and closes the valve when liquid rises into the valve, said valve being outside the vessel permitting release of gas from said vessel when the liquid level immediately falls below the lower end of said conduit but preventing release of liquid therefrom when the liquid rises above the lower end of said conduit.

2. An apparatus as in claim 1 wherein the gas under pressure is an inert gas.

References Cited in the file of this patent

UNITED STATES PATENTS

| | | |
|---|---|---|
| 1,594,483 | Yeomans | Aug. 3, 1926 |
| 1,746,428 | Jennings | Feb. 11, 1930 |
| 2,365,211 | Shafor | Dec. 19, 1944 |
| 2,458,115 | Swenson | Jan. 4, 1949 |
| 2,458,893 | Campbell | Jan. 11, 1949 |
| 2,617,765 | Swarr | Nov. 11, 1952 |